United States Patent [19]

Hiromachi et al.

[11] Patent Number: 5,550,726
[45] Date of Patent: Aug. 27, 1996

[54] AUTOMATIC CONTROL SYSTEM FOR LIGHTING PROJECTOR

[75] Inventors: Yoshio Hiromachi, Tokyo; Tsunehisa Kawahara, Kodaira, both of Japan

[73] Assignee: Ushio U-Tech Inc., Tokyo, Japan

[21] Appl. No.: 128,804

[22] Filed: Sep. 29, 1993

[30] Foreign Application Priority Data

| Oct. 8, 1992 | [JP] | Japan | 4-293943 |
| Oct. 8, 1992 | [JP] | Japan | 4-293944 |
| Oct. 8, 1992 | [JP] | Japan | 4-293945 |

[51] Int. Cl.$^6$ ............... F21P 5/00; G01S 5/00
[52] U.S. Cl. ............... 362/383; 362/283; 362/276; 342/451
[58] Field of Search ............... 362/233, 276, 362/283, 286, 383, 269; 342/387, 450, 451, 465, 463

[56] References Cited

U.S. PATENT DOCUMENTS

| 4,067,015 | 1/1978 | Magarero et al. | 342/451 |
| 4,264,978 | 4/1981 | Whidden | 342/450 |

FOREIGN PATENT DOCUMENTS

64-33802  2/1989  Japan.

*Primary Examiner*—Ira S. Lazarus
*Assistant Examiner*—Sara Sachie Raab
*Attorney, Agent, or Firm*—Frishauf, Holtz, Goodman & Woodward

[57] ABSTRACT

A radio wave signal is transmitted from a radio wave transmitter according to a command from a central control unit, and a supersonic wave is transmitted from a supersonic wave transmitter held by a moving object according to this radio wave signal. A time counter in a supersonic wave detecting device determines the time required from the transmission of the radio wave signal to the detection of the supersonic wave. A coordinate position of the object is calculated on the basis of the thus-obtained time data from a plurality of the supersonic wave detecting devices and positional data of the supersonic wave detecting devices to control the lighting direction of a lighting projector according to a command signal from the central control unit referring to a positional data of the lighting projector. In the case of a plurality of moving objects, supersonic wave transmitters are separately held by the objects, and radio wave signals identified correspondingly to the supersonic wave transmitters are alternately transmitted from the radio wave transmitter. The supersonic wave transmitters detect the radio wave signals identified correspondingly thereto, thereby transmitting respective supersonic waves.

20 Claims, 7 Drawing Sheets

AUTOMATIC CONTROL SYSTEM FOR LIGHTING PROJECTOR

BACKGROUND OF THE INVENTION i) Field of the Invention

The present invention relates to an automatic control system for lighting projectors which serve to light up a theater, studio, hall or the like for purposes of stage effects.

ii) Description of the Background Art

In stage lighting for a theater, it is generally necessary to topically light up a specific place on a stage by a lighting projector, for example, a spotlight or the like for the purpose of realizing desired stage effects. If an object to be lit up on the stage is a moving one such as a person or the like, or a specific place is lit up on the basis of such a moving object, it is necessary to control the lighting projector according to the movement of the object so as to shift its lighting direction.

Usually, the lighting direction of such a lighting projector has heretofore been controlled by an operator of the lighting projector while visually observing the movement of the object.

In the control of the lighting direction of the lighting projector by the operator, however, the operator is required to be skilled in operating technique, and it is very difficult to reliably conduct the intended control of the lighting direction for a long period of time because of difference between individual operators in technical skill, operator's fatigue and the like. In addition, a plurality of lighting projectors are often used in lighting of this sort, and if so, the same number of operators as the lighting projectors are required.

In Japanese Patent Application Laid-Open No. 33802/1989, there has hitherto been proposed an automatic tracking apparatus for a spotlight, which serves to track an moving object for lighting.

This apparatus includes a supersonic wave transmitter held by a moving object to be lit up and adapted to reliably generate a supersonic wave at regular intervals by a clock oscillator, a plurality of supersonic wave sensors for detecting this supersonic wave, another clock oscillator in a control unit, which transmits a wave having a frequency closely similar to that of the clock oscillator held by the object, a time difference detector for detecting a time difference between the clock signal from the clock oscillator in the control unit and the clock signal from the supersonic wave sensor, a computing element for operating a distance between the supersonic wave sensor and the object on the basis of the time difference signal to locate the position of the object, and a control unit for controlling the lighting direction of the spotlight according to an output of the computing element.

According to this apparatus, positional data of the moving object can be obtained theoretically. Therefore, the lighting projector can be controlled to automatically shift the lighting direction thereof, thereby tracking the moving object to light up it.

In practice, this apparatus however involves the following problems:

(1) The frequencies in the supersonic wave transmitter held by the moving object and the clock oscillator in the control unit must be caused to approximate to each other with high precision. In practice, however, it is considerably difficult to achieve this approximation. This difficulty becomes greater as the number of moving objects increases. The solution of this problem requires additional signal processing means such as synchronization of a plurality of clock oscillators by radio wave signals.

(2) When the apparatus is applied to a plurality of moving objects, it is necessary to use supersonic waves having frequencies separately preset on the moving objects and correspondingly, employ supersonic wave sensors corresponding to the preset frequencies. In this case, additional signal processing means are required for the individual frequencies. Therefore, the above-described difficulty becomes more and more marked.

(3) The necessity of the above-described additional signal processing requires complicated signal processing for obtaining a positional data for each moving object and hence prolongs the time required for the control. As a result, the time density of the resulting positional data inevitably becomes low, leading to loose control of the lighting projector in the end.

As described above, the conventional control systems for lighting projectors require complicated constitution and signal processing and consequently involve a problem that control of the lighting projectors according to the movement of moving objects cannot be achieved with high precision.

SUMMARY OF THE INVENTION

It is an object of the present invention to provide an automatic control system for a lighting projector, which can achieve control of the lighting projector with high precision according to the movement of a moving object by simple constitution.

Another object of this invention is to provide an automatic control system for one or more lighting projectors, by which even when the control system is applied to a plurality of moving objects, the control of the lighting projectors can be achieved with high precision for the individual objects.

In an aspect of the present invention, there is thus provided an automatic control system for a lighting projector, comprising:

a central control unit;

a radio wave transmitter for transmitting a radio wave signal according to a transmission command signal from the central control unit;

a supersonic wave transmitter held by a moving object and adapted to transmit a supersonic wave by detecting the radio wave signal;

a plurality of supersonic wave detecting devices each having a time counter which is initialized by a start command signal from the central control unit to start instrumentation, adapted to stop the instrumentation of the time counter by detecting the supersonic wave transmitted from the supersonic wave transmitter, and disposed in different stationary positions; and a lighting projector provided in a stationary position and having a drive mechanism for shifting its lighting direction, said central control unit including:

a timing-system control part, which sends out a transmission command signal to the effect that a radio wave signal is intermittently transmitted, to the radio wave transmitter, and at the same time as the sending of the transmission command signal, the start command signal to the time counters in all the supersonic wave detecting devices;

an arithmetic part for calculating a coordinate position of the object in a space coordinate system preset on the basis of time data according to the time determined by the time counters in the supersonic wave detecting devices and positional data according to coordinate positions occupied by the supersonic wave detecting devices in the space coordinate system; and a lighting control part for sending out a command signal for control of the lighting direction of the lighting projector on the basis of a positional data according to the thus-calculated coordinate position of the object and a positional data according to a coordinate position of the lighting projector in the space coordinate system.

In another aspect of the present invention, there is also provided an automatic control system for lighting projectors, comprising:

a central control unit;

a radio wave transmitter for transmitting radio wave signals according to transmission command signals from the central control unit;

supersonic wave transmitters separately held by two or more moving objects and adapted to transmit respective supersonic waves by detecting the radio wave signals identified correspondingly to the supersonic wave transmitters;

a plurality of supersonic wave detecting devices each having a time counter which is initialized by a start command signal from the central control unit to start instrumentation, adapted to stop the instrumentation of their corresponding time counters by detecting the supersonic wave transmitted from the supersonic wave transmitter, and disposed in different stationary positions; and at least one lighting projector provided at stationary position and having a drive mechanism for shifting its lighting direction, said central control unit including:
  a timing-system control part, which sends out a transmission command signal to the effect that radio wave signals identified correspondingly to the supersonic wave transmitters are transmitted alternately, to the radio wave transmitter, and at the same time as the sending of the transmission command signal, the start command signal to the time counters in all the supersonic wave detecting devices;
  an arithmetic part for calculating coordinate positions of the objects in a space coordinate system preset on the basis of time data according to the time determined by the time counters in the supersonic wave detecting devices and positional data according to coordinate positions occupied by the supersonic wave detecting devices in the space coordinate system; and
  a lighting control part for sending out their corresponding command signals for control of the lighting directions of the lighting projectors on the basis of positional data according to the thus-calculated coordinate positions of the objects and positional data according to coordinate positions of the lighting projectors in the space coordinate system.

In the system of such constitution according to the first aspect, the radio wave signal is transmitted intermittently from the radio wave transmitter according to the transmission command signal from the central control unit. When this radio wave signal is detected, a supersonic wave is transmitted from the supersonic wave transmitter held by the moving object. At the same time, the time counters in all the supersonic wave detecting devices are initialized according to the start command signal from the central control unit to start timing, thereby separately determining the elapsed time until the supersonic wave from the supersonic wave transmitter is detected by the supersonic wave detecting devices.

However, since the time required until the radio wave signal from the radio wave transmitter reaches the supersonic wave transmitter can be substantially omitted, the time determined here is substantially the time required until the supersonic wave reaches each supersonic wave detecting device from the supersonic wave transmitter. Accordingly, the time data according to the time determined serves as a data indicative of a distance between the object and the supersonic wave detecting device.

In the arithmetic part in the central control unit, a coordinate position of the object in the space coordinate system is calculated on the basis of the time data from a plurality of the supersonic wave detecting devices and the positional data according to the coordinate positions occupied by the supersonic wave detecting devices in the space coordinate system. Further, a command signal for control of the lighting direction of the lighting projector is sent out of the central-control unit on the basis of a positional data according to the thus-calculated coordinate position of the object referring to a positional data according to a coordinate position of the lighting projector in the space coordinate system, thereby controlling the lighting projector so as to light up a desired position on the basis of the object.

In the second aspect in which the control system is applied to a plurality of moving objects, the supersonic wave transmitters are separately held by the objects. Radio wave signals identified correspondingly to the supersonic wave transmitters are transmitted alternately from the radio wave transmitter according to transmission command signals from the central control unit. At the same time as the sending of the transmission command signal, the central control unit sends out a start command signal to the time counters in all the supersonic wave detecting devices. In the supersonic wave transmitters, respective supersonic waves are transmitted by detecting the radio wave signals identified correspondingly to the supersonic wave transmitters.

According to such constitution, the supersonic wave transmitters held by the individual objects are specified by the identified radio wave signals assigned in the central control unit. Therefore, it is possible to identify the supersonic wave transmitter held by the object as functions with the time data from the supersonic wave detecting devices, thereby permitting control of the lighting directions of the lighting projectors on the basis of the objects.

According to the automatic control systems for lighting projectors of the present invention, a coordinate position of an object which holds a supersonic wave transmitter, in a space coordinate system can be reliably calculated by a simple information processing making good use of the characteristics of radio wave and supersonic wave. A lighting projector is controlled on the basis of this data. Therefore, using a moving object as a basis for position, such an object or a place standing in a certain positional relationship to the object, namely, a place standing in a constant positional relationship even if the time goes on or in a positional relationship varying with time can be lit up. In addition, since information can be processed simply, the time density of the control operation can be increased with ease. As a result, the lighting direction of the lighting projector can be controlled with high precision according to the movement of the moving object.

Even if the control system is applied to a plurality of moving objects, supersonic wave transmitters held by the objects can be identified in the central control unit. With respect to the individual objects, the control of the lighting direction or directions of lighting projector or projectors can thus be achieved with high precision like the above description.

The above and other objects, features and advantages of the present invention will be readily appreciated from the preferred embodiments of the present invention, which will be described subsequently in detail.

DETAILED DESCRIPTION OF THE INVENTION AND PREFERRED EMBODIMENTS

Figure 1:
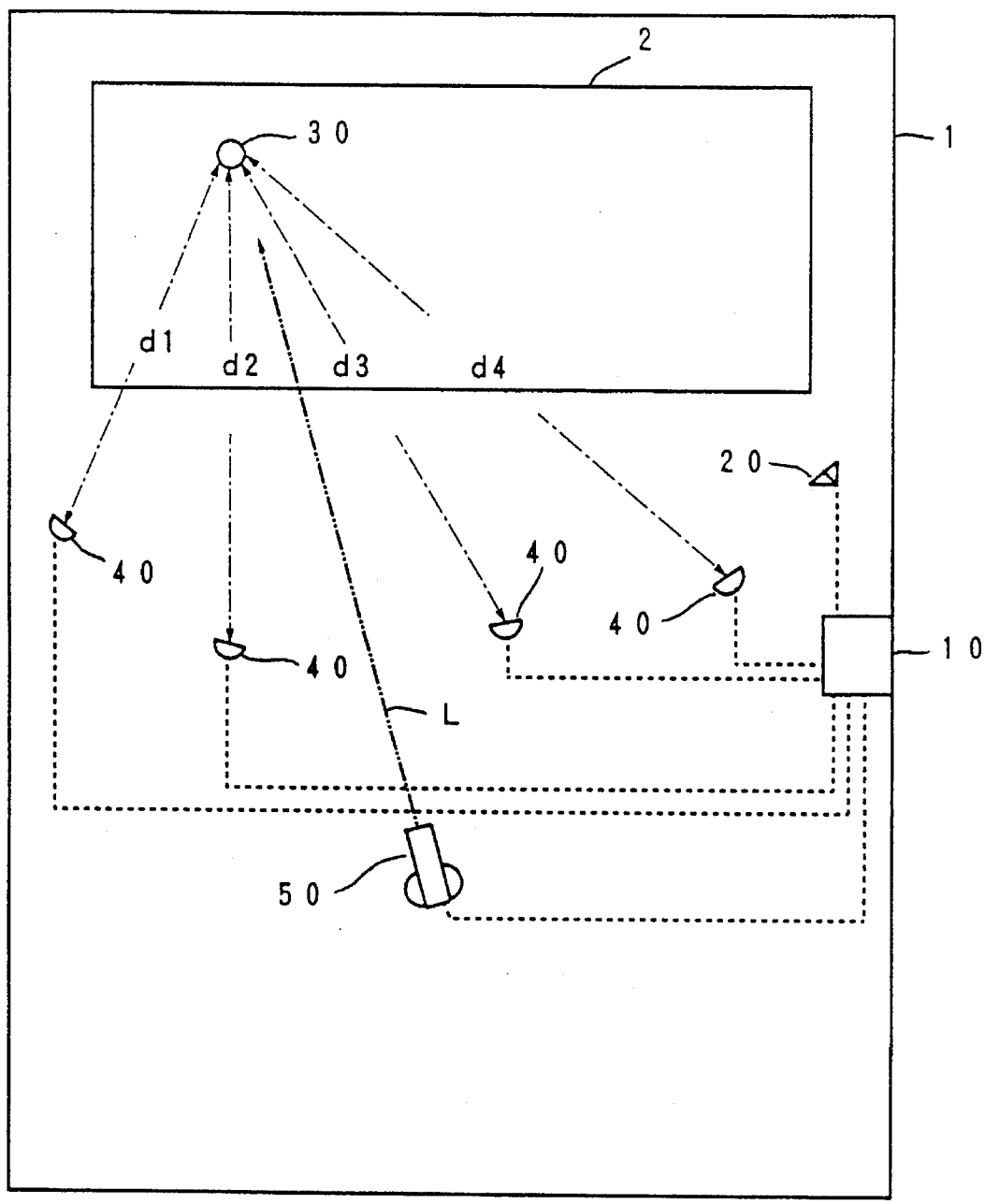
FIG. 1 explanatorily illustrates the constitution of an automatic control system for a lighting projector according to the first embodiment of the present invention in a state applied to a theater.
Figure 2:
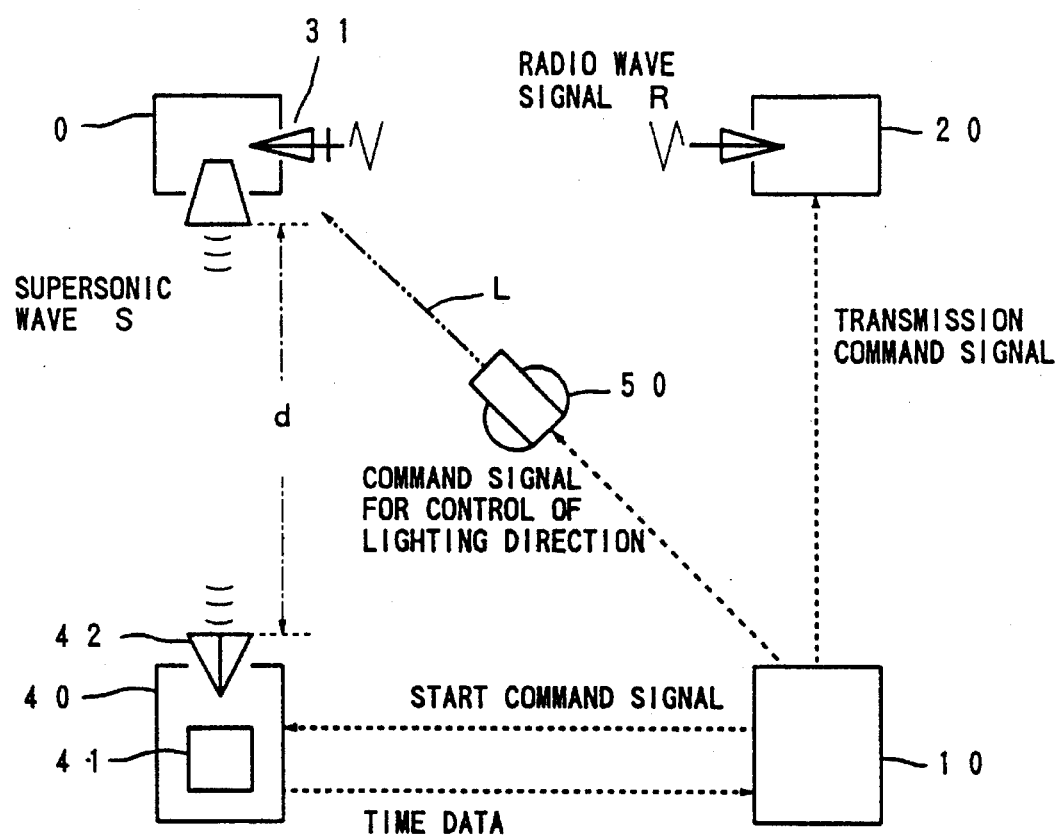
FIG. 2 explanatorily illustrates outlines of principal functional parts in the control system according to the first embodiment and a state of their connection.

FIG. 1 explanatorily illustrates the constitution of an automatic control system for a lighting projector according to the first embodiment of the present invention in a state applied to a theater. Reference numerals 1 and 2 indicate a theater and a stage thereof, respectively. FIG. 2 explanatorily illustrates outlines of principal functional parts in the control system according to the first embodiment and a state of their connection.

As illustrated in FIGS. 1 and 2, a central control unit 10 is provided within the theater 1. A radio wave transmitter 20 which transmits a radio wave signal R according to a transmission command signal sent out of the central control unit 10 is provided in connection with the central control unit 10.

Reference numeral 30 denotes a supersonic wave transmitter held by an object such as a person moving on the stage 2. The supersonic wave transmitter 30 is equipped with a radio wave sensor 31 for detecting the radio wave signal R transmitted from the radio wave transmitter 20, and adapted to transmit a supersonic wave S when the radio wave sensor 31 detects the radio wave signal R.

A plurality of supersonic wave detecting devices 40 each having a time counter 41 are disposed on suitable stationary positions in the theater 1, for example, ceiling, wall, floor, etc. A lighting projector 50 which can three-dimensionally shift its lighting direction is provided on a stationary position facing the stage 2.

Figure 3:
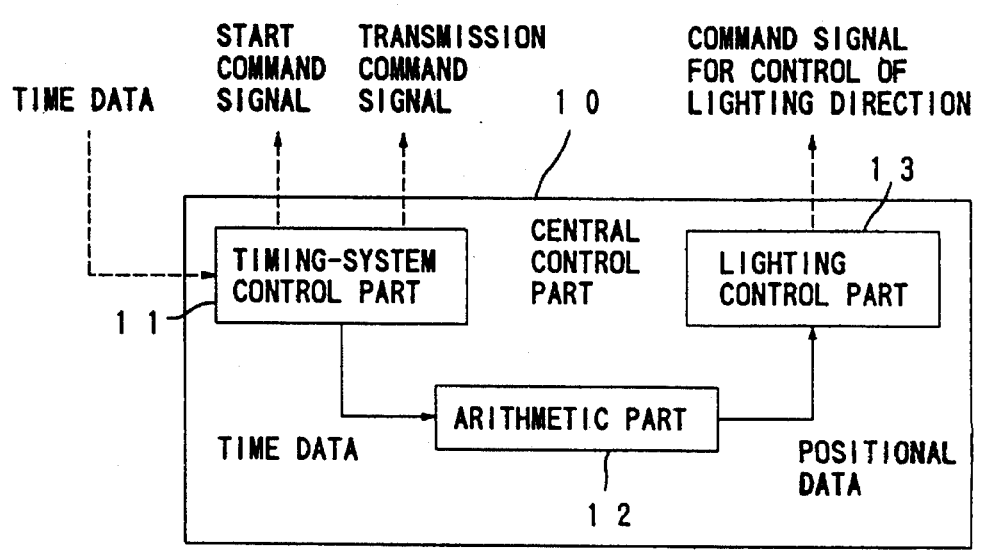
FIG. 3 is a block diagram illustrating an outline of the constitution of a central control unit.

As illustrated in FIG. 3, the central control unit 10 includes a timing-system control part 11, an arithmetic part 12 and a lighting control part 13.

The supersonic wave detecting devices 40 and the lighting projector 50 are connected respectively to the timing-system control part 11 and the lighting control part 13 of the central control unit 10 either through wire or by wireless so as to permit their data communication.

The timing-system control part 11 functions so as to simultaneously send out a transmission command signal to the radio wave transmitter 20 and a start command signal to the effect that the time counter 41 in each detecting device 40 is initialized to reset and instrumentation is started, to the supersonic wave detecting devices 40, and moreover fulfills a function of receiving time data from the supersonic wave detecting devices 40 to send them to the arithmetic part 12.

As will be described in detail subsequently, the arithmetic part 12 fulfills a function of calculating a coordinate position of the supersonic wave transmitter 30 in a space coordinate system on the basis of the time data from the supersonic wave detecting devices 40 and positional data according to coordinate positions of the supersonic wave detecting devices 40 in the space coordinate system.

In order to perform such a function, positional data according to respective coordinate positions, in which the supersonic wave detecting devices 40 occupy, for example, in a three-dimensional space coordinate system optionally preset regarding a given position in the theater 1 as an origin are registered in the arithmetic part 12. These positional data may be optionally accessed. In addition, a positional data according to a coordinate position in which the lighting projector 50 occupies in the space coordinate system is accessibly registered therein.

The lighting control part 13 fulfills a function of referring to the positional data according to the coordinate position of the object, which has been calculated in the arithmetic part 12, and the positional data according to the coordinate position in which the lighting projector 50 occupies in the space coordinate system to send out a command signal for control of the lighting direction of the lighting projector 50 to the lighting projector 50.

In the above description, the radio wave signal R transmitted from the radio wave transmitter 20 according to the transmission command signal is a signal consisting of a specific frequency component and acts as so-called trigger for transmitting the supersonic wave S to the supersonic wave detecting devices 30. No particular limitation is imposed on the frequency of this radio wave signal R, and it may be determined optionally.

The radio wave transmitter 20 may be either provided in a position different from that of the central control unit 10 or united with the central control unit 10.

The supersonic wave transmitter 30 held by the object has the radio wave sensor 31 for detecting the radio wave signal R transmitted from the radio wave transmitter 20, and fulfills a function of transmitting a supersonic wave S having a specific frequency when the sensor detects the radio wave signal R. The frequency of the supersonic wave may preferably be selected within a range of from 20 kHz to 80 kHz though it may vary according to the width of the theater 1 and the moving area of an object to be lit up.

It goes without saying that the supersonic wave transmitter 30 must be portable. It is therefore preferable to use a small battery as a drive power source. The supersonic wave transmitter 30 may preferably be provided with a holding member such as band by which the object can conveniently hold the transmitter 30, or with a pin or clip for fastening the transmitter 30 to a part of a costume.

Each of the supersonic wave detecting devices 40 includes a time counter 41 and a supersonic wave sensor 42, and fulfills a function of stopping instrumentation that has been started according to the start command signal, by detecting the supersonic wave, thereby determining the time T required from the transmission of the start command signal from the central control unit 10 to the detection of the supersonic wave.

A plurality of the supersonic wave detecting devices 40 are arranged at suitable intervals, and all time data obtained by the supersonic wave detecting devices 40 are inputted into the timing-system control part 11.

Figure 4:
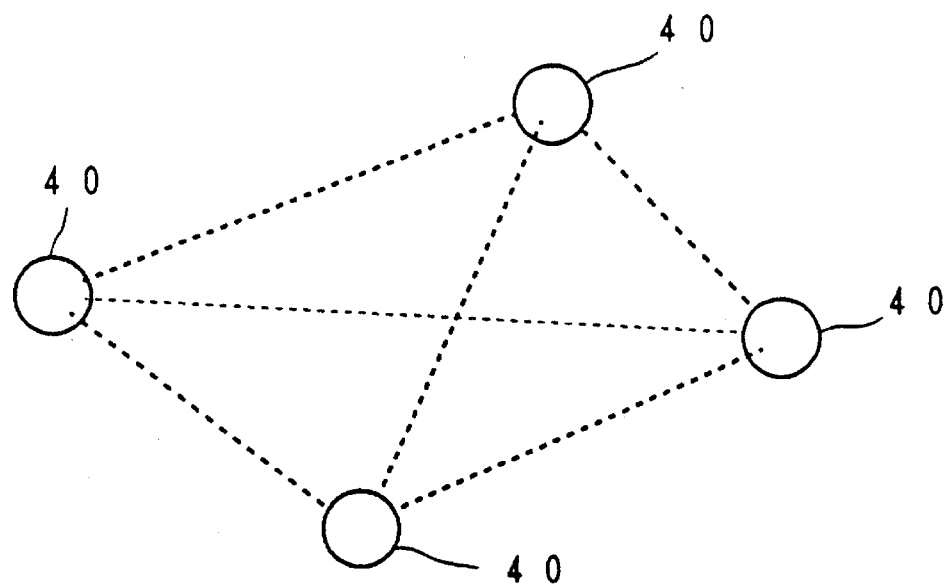
FIG. 4 explanatorily illustrates a state of arranged supersonic wave detecting devices.

The number of the supersonic wave detecting devices 40 is at least 3, preferably at least 4. Their arranging condition may be suitably preset according to the width and structure of the theater, and other conditions. As illustrated in FIG. 4 by way of example, it is however preferred that four supersonic wave detecting devices 40 arranged contiguously to each other be disposed in three-dimensionally different positions so as not to cause all the devices to exist on a common plane.

Figure 5:
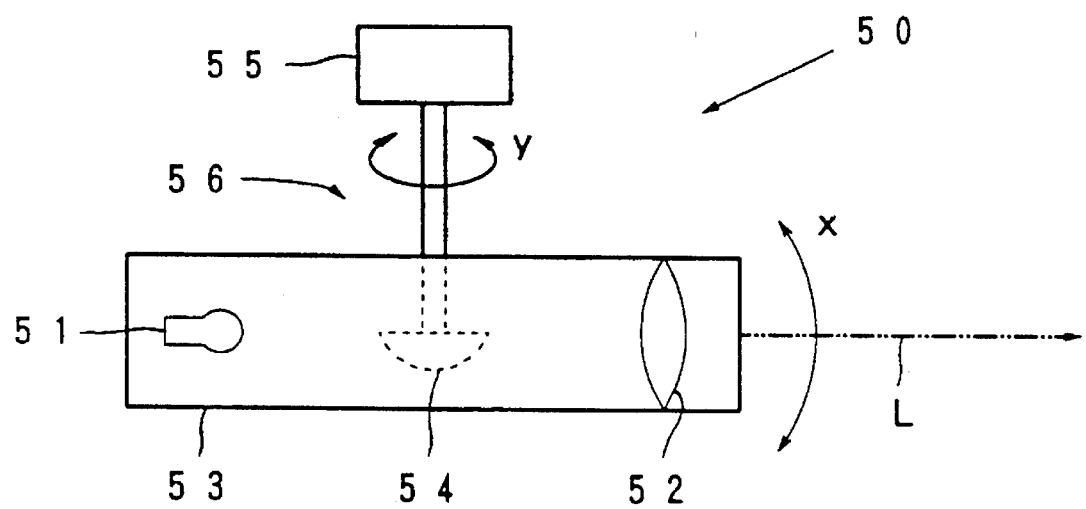
FIG. 5 explanatorily illustrates the constitution of an illustrative lighting projector.

As illustrated in FIG. 5, the lighting projector 50 includes an illuminator 53 having a lamp 51 for a light source, which consists of a xenon discharge lamp by way of example, and a lens 52, and projecting light beams in a specific direction, and a drive mechanism 56 having a first motor 54 for rotating the illuminator 53 about a horizontal axis of rotation perpendicular to an optical axis L as indicated by an arrow x and a second motor 55 for rotating the illuminator 53 about a vertical axis of rotation perpendicular to the optical axis L as indicated by an arrow y. The projecting direction of the light beams is shifted by the drive mechanism 56.

Driving characteristics of the drive mechanism 56 in the lighting projector 50 are registered in the central control unit 10. For example, the reference stop positions of the first and second motors 54 and 55 are regarded as respective starting reference positions. A coordinate position of a target position to be lit up by the illuminator 53 in the space coordinate system at this time is registered in the lighting-system control part 13 in the central control unit 10, and a coordinate position of a target position to be lit up by the illuminator 53 when stopping the first motor 54 in the state of the reference position and the second motor 55 in the state rotated by a given angle from the reference position is registered in the lighting-system control part 13 in the central control unit 10.

More specifically, a vector connecting the supersonic wave transmitter 30 held by the moving object and the lighting projector 50 is found on the basis of two vectors separately connecting these two space coordinates and the space coordinate of the lighting projector 50. The lighting direction of the lighting projector 50 is controlled on the basis of this vector.

The operation of the above automatic control system for the lighting projector will next be described.

The central control unit 10 sends out a transmission command signal to the radio wave transmitter 20, and at the same time a start command signal to the effect that the time counter 41 is started, to the supersonic wave detecting devices 40.

Therefore, the radio wave signal R transmitted from the radio wave transmitter 20 is detected by the radio wave sensor 31 in the supersonic wave transmitter 30, and at the same time, the supersonic wave S is transmitted from the supersonic wave transmitter 30.

On the other hand, the time counter 41 in each of the supersonic wave detecting devices 40 is initialized according to the start command signal to start instrumentation. The supersonic wave detecting devices 40 detect the supersonic wave S, whereby the instrumentation of the time counters 41 is stopped. Time data according to the time thus determined are transmitted from the time counters 41 to the timing-system control part 11 in the central control unit 10 and then inputted into the arithmetic part 12.

Here, the time T determined by each time counter 41 is the time required from the transmission of the start command signal to the detection of the supersonic wave by its corresponding supersonic wave detecting device 40. However, since the time required from the transmission of the transmission command signal to the transmission of the supersonic wave by the supersonic wave transmitter 30 is extremely short, and hence can be substantially omitted, the time T determined is substantially equal to the time required from the transmission of the supersonic wave by the supersonic wave transmitter 30 to the detection of the supersonic wave by the supersonic wave detecting device 40. Accordingly, the time data from the time counter 41 corresponds to a distance d between the supersonic wave detecting device 40 and the object by which the supersonic wave transmitter 30 is held (see FIG. 2).

In the arithmetic part 12 in the central control unit 10, a coordinate position of the supersonic wave transmitter 30 in the space coordinate system is calculated from the velocity of the supersonic wave on the basis of, for example, three or four time data selected from among the time data transmitted from the supersonic wave detecting devices 40 and of the positional data of the supersonic wave detecting devices 40 pertaining to these time data.

In case that a number of supersonic wave detecting devices are provided, time data to be selected are preferably selected in order of the determined time T, beginning with the shortest, in the time data from all the supersonic wave detecting devices 40, or in order of the energy, beginning with the greatest, of the supersonic wave detected in the supersonic wave detecting devices 40. The time data shortest in the determined times T or greatest in the energy of the detected supersonic waves are obtained from the supersonic wave detecting devices 40 located in regions nearest to the object. Therefore, such selection of the time data can reliably avoid the detection of noise supersonic waves forming the cause of error, such as supersonic waves reflected by the wall of the theater and/or the like.

Figure 6:
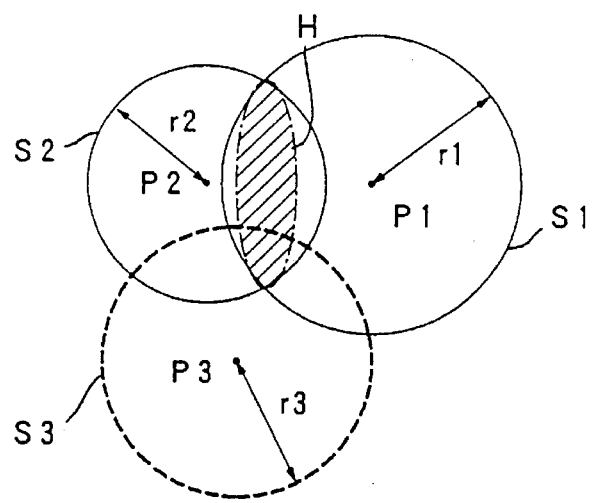
FIG. 6 explanatorily illustrates a principle in which the position of a supersonic wave transmitter is specified by three supersonic wave detecting devices.
Figure 7:
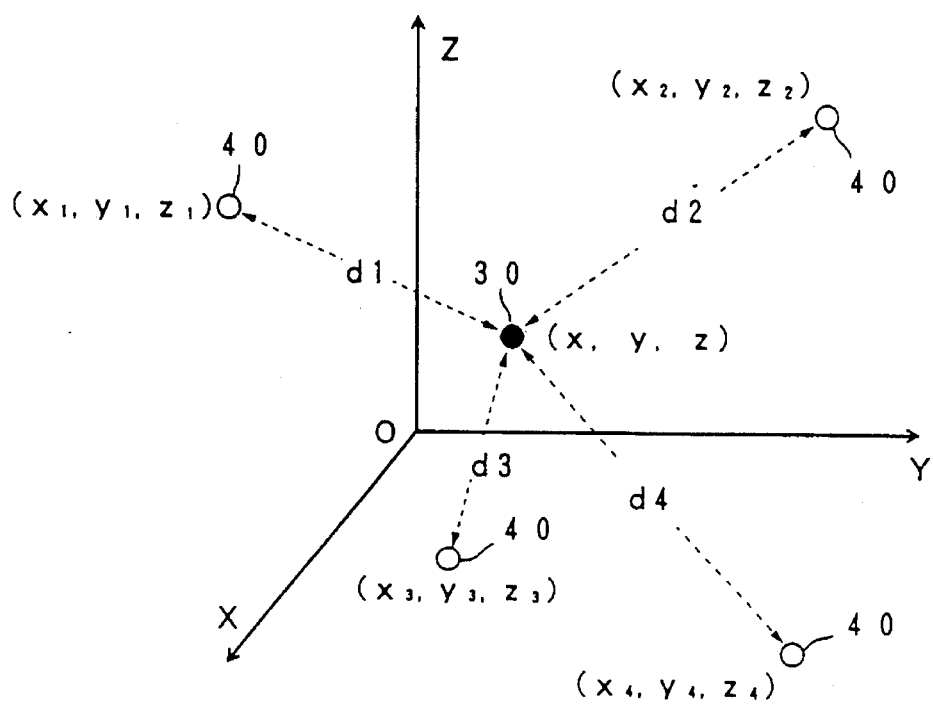
FIG. 7 explanatorily illustrates a principle in which the position of a supersonic wave transmitter is specified by four supersonic wave detecting devices.

In the case where three time data are used, the coordinate position of the supersonic wave transmitter 30 can be calculated in accordance with the following principle:

Namely, as illustrated in FIG. 6, distances between three individual supersonic wave detecting devices 40 and the supersonic wave transmitter 30, which are calculated on the basis of the time data detected by these supersonic wave detecting devices 40, are regarded as r1, r2 and r3, and the positions of the supersonic wave detecting devices 40 are assumed to be P1, P2 and P3, respectively. At this time, the position of the supersonic wave transmitter 30 must be present on intersections of three spherical surfaces S1, S2 and S3, of which centers and radii are points P1, P2 and P3, and distances r1, r2 and r3, respectively.

More specifically, a set of intersections of two spherical surfaces S1 and S2 forms a circle which is illustrated as an ellipse H indicated by oblique lines in FIG. 6. The intersections of this ellipse and the spherical surface S3 are equal to the intersections of the three spherical surfaces.

Accordingly, it is only necessary to set up simultaneous equations which express such three spherical surfaces S1, S2 and S3 in the space coordinate system, and solve them so as to find their solutions. The number of the solutions obtained here is 1 or 2. When 2 solutions exist, a more rational solution is selected in consideration of other conditions, for example, the level of the object in a height direction.

In the case where four time data are used, as illustrated in FIG. 4, coordinate positions of four supersonic wave detecting devices 40 in an XYZ space coordinate system are regarded as $(x_1,y_1,z_1)$, $(x_2,y_2,z_2)$, $(x_3,y_3,z_3)$ and $(x_4,y_4,z_4)$, and a coordinate position of the supersonic wave transmitter 30 is assumed to be $(x,y,z)$. At this time, distances d1, d2, d3 and d4 between the supersonic wave transmitter 30 and four individual supersonic wave detecting devices 40 are represented by the following respective equations:

$$(d1)^2 = (x-x_1)^2 + (y-y_1)^2 + (z-z_1)^2 \quad (1)$$

$$(d2)^2 = (x-x_2)^2 + (y-y_2)^2 + (z-z_2)^2 \quad (2)$$

$$(d3)^2 = (x-x_3)^2 + (y-y_3)^2 + (z-z_3)^2 \quad (3)$$

and $$(d4)^2 = (x-x_4)^2 + (y-y_4)^2 + (z-z_4)^2 \quad (4)$$

Therefore, the above equations are solved as to x, y and z, whereby the coordinate position $(x,y,z)$ of the supersonic wave transmitter 30 can be calculated exactly.

The lighting direction of the lighting projector 50 is controlled according to a command signal for control of the lighting projector from the lighting control part 13 in the central control unit 10 on the basis of the thus-calculated positional data of the supersonic wave transmitter 30 according to the space coordinate, the positional data of the lighting projector 50 according to the space coordinate and the drive characteristics of the drive mechanism 56. As a result, the lighting of a place on the basis of the object can be achieved.

In the above description, the time counter 41 in each supersonic wave detecting device 40 can time with precision of, for example, about 0.0001 sec. Therefore, this precision participates in the error range in the positional data of the supersonic wave transmitter 30. However, since the propagation velocity of the supersonic wave in the air is about 340 m/sec, the error in distance on the stage is 3.4 cm even in the greatest. Accordingly, the coordinate position of the supersonic wave transmitter 30, i.e., the object can be determined with extremely high precision.

The time required for one control operation, namely, the time required from the time the central control unit 10 transmits the transmission command signal to the time the lighting direction of the lighting projector 50 is controlled is about 50–200 msec by way of example though it may vary according to the distance between the supersonic wave transmitter 30 and the supersonic wave detecting device 40. This means that the transmission of the transmission command signal by the central control unit 10, in other words, the transmission of the radio wave signal can be performed at time intervals of about 5–20 times per second, i.e., time intervals as short as 200 msec or less. According to the first embodiment of the present invention, the control of the lighting direction can thus be executed with an extremely high time density.

When the time density in the transmission of the transmission command signal by the central control unit 10 is preset to 20 times per second, the time interval thereof is 50 msec. Therefore, it is necessary to complete the transmission of the command signal for control of the lighting direction and the control of the lighting projector 50 according to this signal within this time period, and hence to limit the permissible instrumentation time in the time counter 41 of each supersonic wave detecting device 40 to less than about 50 msec at the longest.

The range of the distance that the supersonic wave attains within the longest instrumentation time in the time counter 41 is a detectable region covered by the supersonic wave detecting device 40. Therefore, when the longest instrumentation time of the time counter 41 is preset to 45 msec, the detectable region of the supersonic wave detecting device 40 is a spherical region with a radius of 15.3 m since the propagation velocity of the supersonic wave in the air is about 340 m/sec.

As understood from the above description, according to the automatic control system for the lighting projector, the supersonic wave from the supersonic wave transmitter 30 is detected by all the supersonic wave detecting devices 40. However, since the length in time determined in each supersonic wave detecting device 40 varies according to the position of the supersonic wave transmitter 30, namely, the position of the object, the coordinate position of the object in the space coordinate system is determined, whereby the lighting direction of the lighting projector 50 is controlled. Therefore, the lighting can be achieved using the object as a basis for position.

Moreover, since the lighting direction of the lighting projector 50 can be controlled at least 5 times, preferably at least 10 times per second, desired lighting can be conducted with fidelity to the movement of the object with high precision even when the object moves at a considerably high speed. The movement of a lighting position can also be conducted extremely smoothly.

In the supersonic wave transmitter 30, the supersonic wave is transmitted only at the time the radio wave signal is transmitted from the radio wave transmitter 20, and not transmitted constantly and continuously. Therefore, the electric power consumed is slight, and even when a battery is used as a power source, long serviceable time can be achieved.

The lighting by the lighting projector 50 can be performed, specifically, in various forms making use of the object as a basis for position.

The simplest form of the lighting is to directly light up a moving object. In this case, the direction of the lighting projector 50 is controlled in the direction of the calculated coordinate position of the object.

When two or more lighting projectors 50 are used, individual identification signals are contained in the command signal for control of the lighting direction from the lighting control part 13, whereby a lighting projector 50 to be controlled can be selected, and moreover the lighting direction of the lighting projector 50 thus selected can be controlled. In this case, a plurality of places can be lit up on the basis of one object.

A place standing in a specific positional relationship to the moving object may also be lit up.

Figure 8:
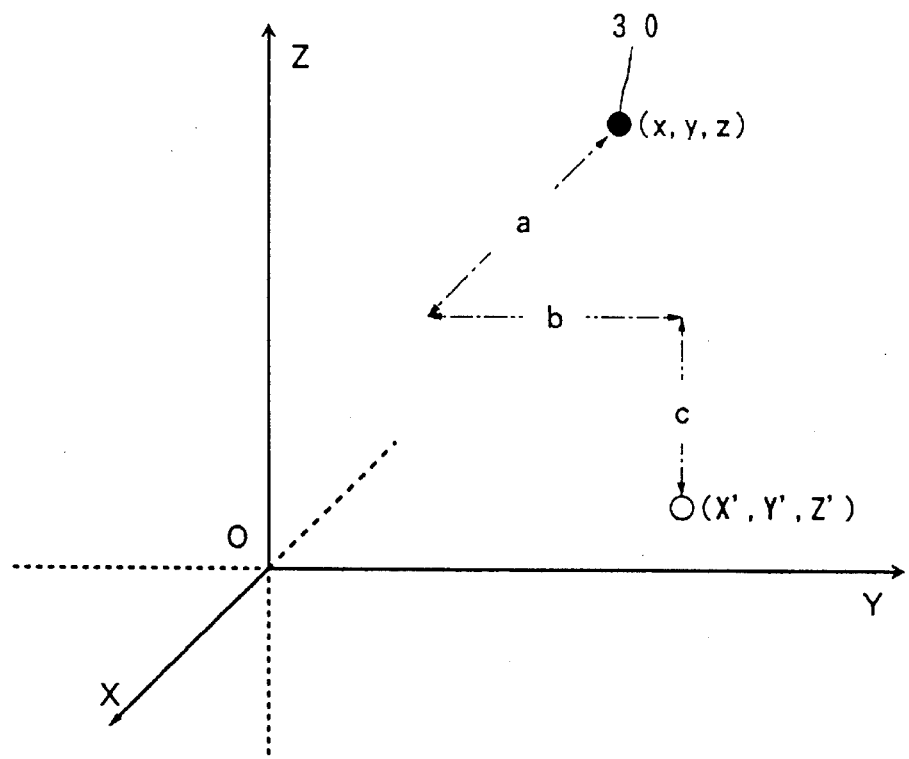
FIG. 8 explanatorily illustrates an embodiment of lighting performed by a lighting projector controlled by the control system of the present invention.

For example, if the coordinate position of the supersonic wave transmitter 30 is regarded as (x,y,z) as illustrated in FIG. 8, a place represented by a coordinate position (X', Y', Z') defined by specific equations of X'=x+a, Y'=y+b and Z'=z+c can be lit up, whereby the place standing in the specific positional relationship to the moving object can be lit up.

Figure 9:
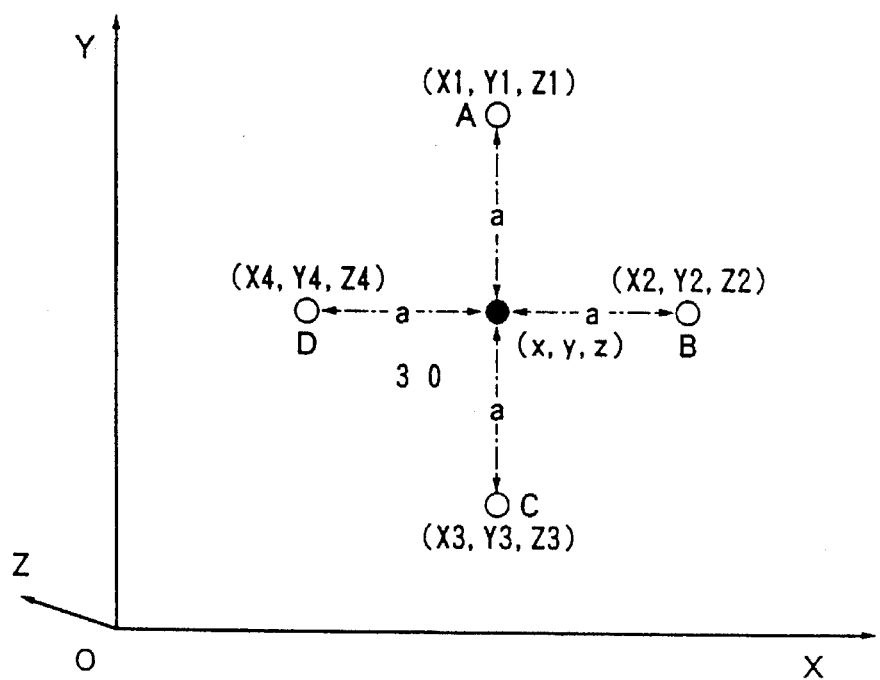
FIG. 9 explanatorily illustrates another embodiment of lighting.

When four lighting projectors by way of example are used, four places A, B, C and D standing in specific positional relationships to the supersonic wave transmitter 30 and defined by the following equations (5) to (8) may be lit up as illustrated in FIG. 9.

Place $A$ (5):$X1=x$, $Y1=y+a$ and $Z1=z$;

Place $B$ (6):$X2=x+a$, $Y2=y$ and $Z2=z$;

Place $C$ (7):$X3=x$, $Y3=y-a$ and $Z3=z$;

and

Place $D$ (8):$X4=x-a$, $Y4=y$ and $Z4=z$.

As described above, when a place standing in a specific positional relationship to the object is lit up, it is natural that the lighting place should move with the object.

The lighting may be performed in such a form that the positional relationship varies with time using the object as a basis for position.

Figure 10:
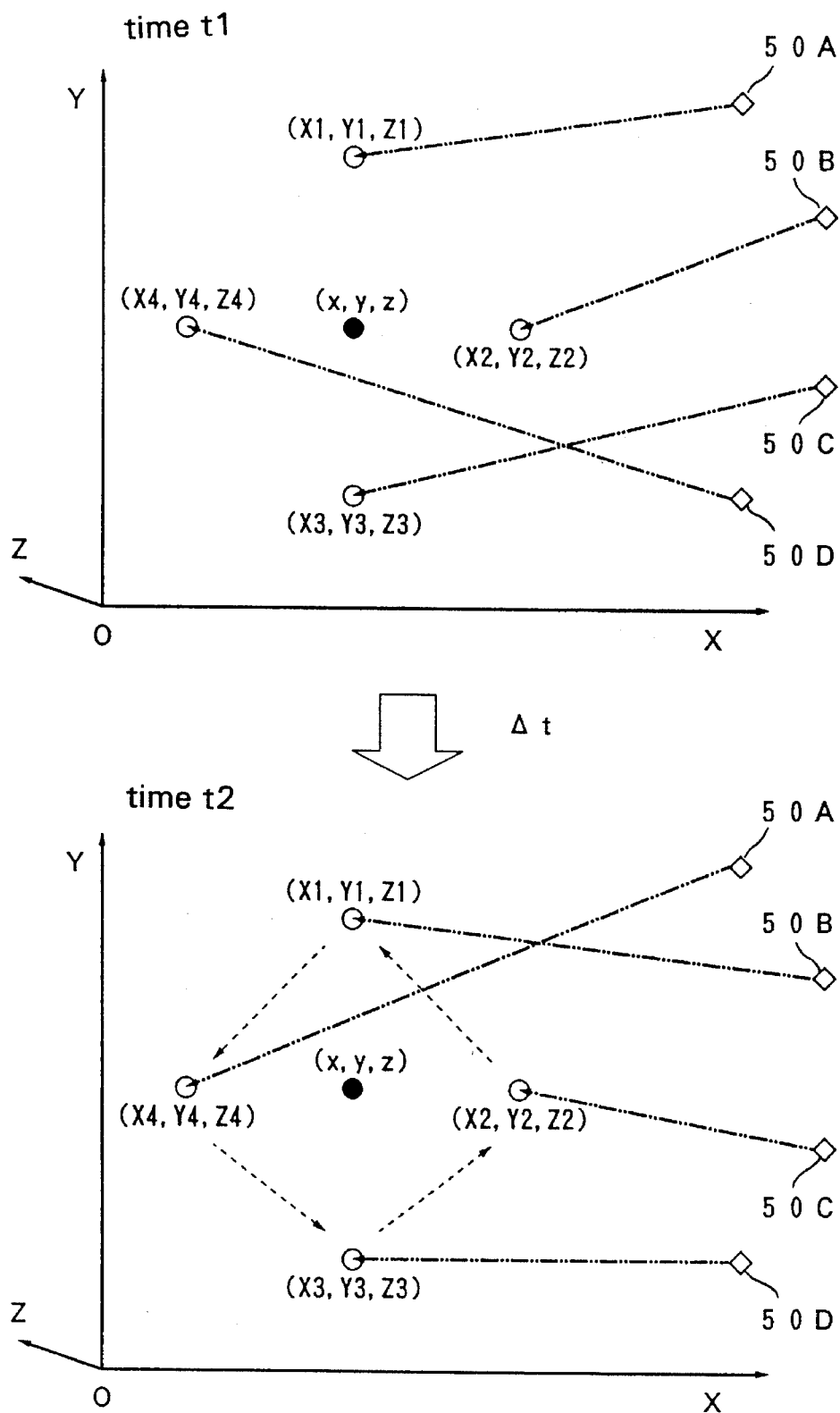
FIG. 10 explanatorily illustrates a further embodiment of lighting where positions standing in positional relationships varying with time are lit up.

For example, if four lighting projectors 50A, 50B, 50C and 50D are used as illustrated in FIG. 10, they may be controlled in such a manner that at the time t1, the lighting projectors 50A, 50B, 50C and 50D light up respectively places of coordinate positions (X1,Y1,Z1), (X2,Y2,Z2), (X3,Y3,Z3) and (X4,Y4,Z4), and at the time t2 after a period of time of $\Delta t$ has elapsed, the lighting projectors 50A, 50B, 50C and 50D light up respectively places of coordinate positions (X4,Y4,Z4), (X1,Y1,Z1), (X2,Y2,Z2) and (X3,Y3,Z3).

In this case, the movement of places to be lit up by the individual lighting projectors can be performed in any given form such as a momentary change, gradual change or change by steps.

The second embodiment of the present invention will hereinafter be described.

Figure 11:
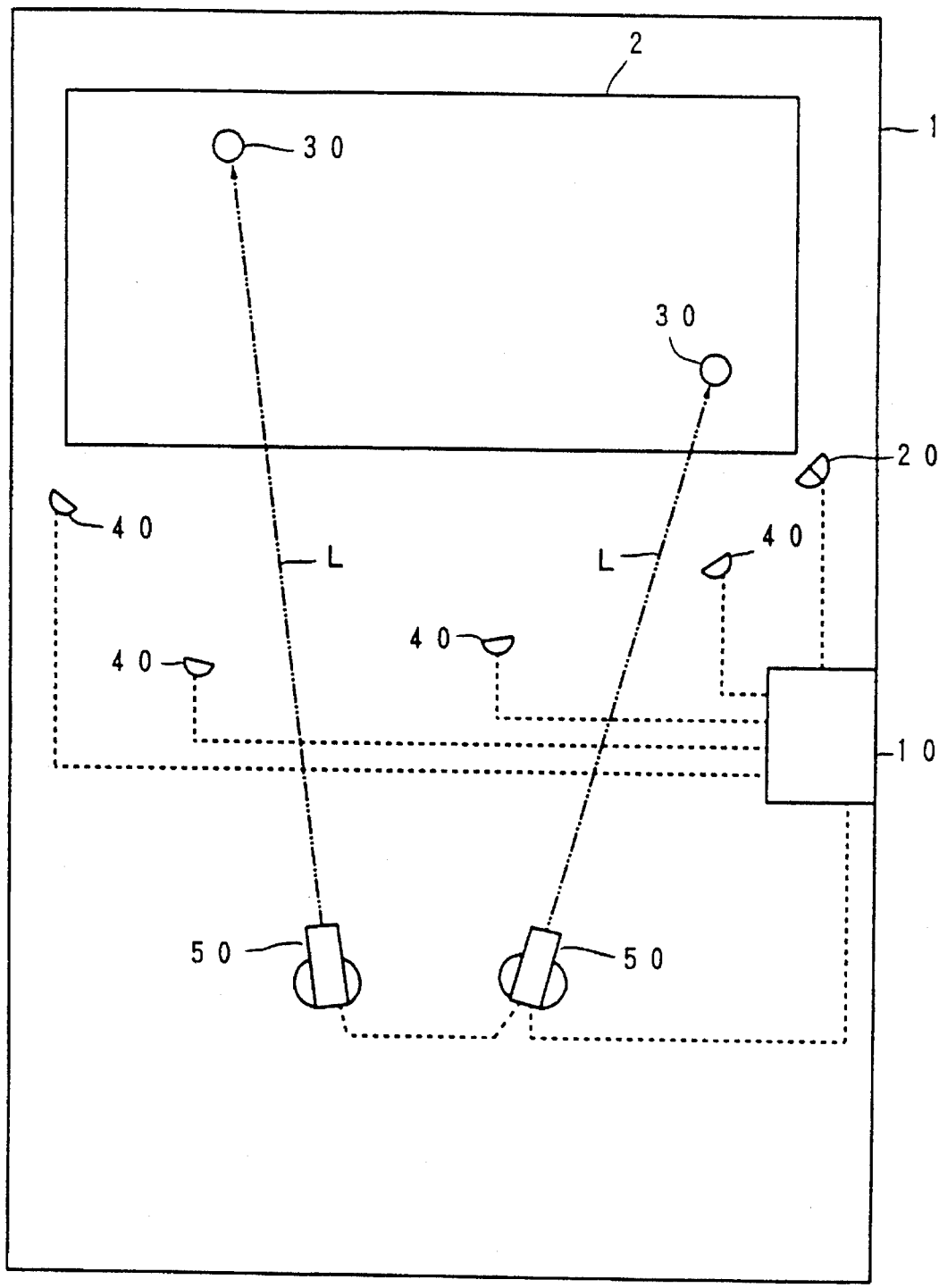
FIG. 11 explanatorily illustrates the constitution of an automatic control system for lighting projectors according to the second embodiment of the present invention in a state applied to a theater.

FIG. 11 explanatorily illustrates an automatic control system for lighting projectors according to the second embodiment of the present invention. In this embodiment, supersonic wave transmitters 30 are separately held by two objects moving on the stage 2, and two lighting projectors 50 are provided.

A timing-system control part 11 in a central control unit 10 fulfills a function of sending a transmission command signal to the effect that two kinds of radio wave signals identified correspondingly to the individual supersonic wave transmitters 30 are alternately transmitted, to a radio wave transmitter 20.

The radio wave signals identified may be signals different in frequency by way of example. However, they may be radio wave signals having the same frequency, but separately containing identification components preset on each of the supersonic wave transmitters 30.

A supersonic wave sensor 31 in each of the supersonic wave transmitters 30 separately held by the two objects fulfills a function of detecting the radio wave signal identified correspondingly thereto from among the identified radio wave signals transmitted by the radio wave transmitter 20. The supersonic wave transmitter 30 transmits the supersonic wave by detecting such a radio wave signal.

Further, a start command signal is sent from the timing-system control part 11 to all supersonic wave detecting devices 40 irrespective of the identified radio wave signals at the same time as the sending of the transmission command signal from the central control unit 10.

With respect to the two lighting projectors 50, individual identification signals corresponding to the plural lighting projectors 50 are contained in their corresponding command signals for control of the lighting direction from a lighting control part 13 as with the embodiment described above, whereby a lighting projector 50 to be controlled is selected according to the identification signal, and the lighting projector 50 thus selected is controlled to shift the projecting direction of light beams.

Features other than those described above are the same as those in the first embodiment.

According to the control system of such constitution, the lighting directions of the two lighting projectors 50 can be controlled using the two objects as respective bases for position in basically the same manner as in the first embodiment.

For example, two kinds of identified radio wave signals separately corresponding to the supersonic wave transmitters 30 held by both objects are alternately transmitted each 2.5 to 10 times, preferably 5 to 10 times per second according to the transmission command signal from the timing-system control part 11 in the central control unit 10, whereby the positions of the objects can be located, and the lighting directions of the lighting projectors 50 can be controlled correspondingly.

In this embodiment, the specific places and forms of lighting by the lighting projectors 50 may also be variously preset like the first embodiment. More specifically, it is possible to light up moving objects, places standing in specific positional relationships to the moving objects and places standing in positional relationships varying with time to the moving objects.

In this embodiment, a specific lighting projector 50 need not be always controlled in relation to a specific supersonic wave transmitter 30 or object. As needed, a supersonic wave transmitter used as a basis for position may be changed to another supersonic wave transmitter.

Further, a specific supersonic wave transmitter 30 may be used as a common basis for position to control a plurality of lighting projectors 50.

As described above, no particular limitation is imposed on the number of objects and the number of lighting projectors in this embodiment. However, if the number of objects is great, a time interval between one control operation from the collection of a positional data as to an object to control of the lighting direction of a lighting projector according to the data and the next control operation becomes longer.

Since the time density of control must be actually at least 2.5 times per second (400 msec or shorter in terms of time interval), the number of kinds of identified radio wave signals from the common radio wave transmitter 20 are selected according to this condition. For example, if a time interval in the transmission of the radio wave signal is 50 msec, it is preferred that the kinds of the identified radio wave signals be 8 or fewer. In this case, the number of objects or supersonic wave transmitters to be processed by one control system amounts to 8 or fewer.

If this embodiment is applied to still more objects, it is only necessary to use a plurality of the control systems according to this embodiment. In this case, it is necessary to discriminate among frequencies of radio wave signals from radio wave transmitters and supersonic waves transmitted from supersonic wave transmitters in individual control systems so as to avoid the cross of communication between the control systems. It goes without saying that a central control unit may be used in common in the plural control systems so long as it has a sufficient capacity.

What is claimed is:

1. An automatic control system for a lighting projector, comprising:

a central control unit;

a radio wave transmitter for transmitting a radio wave signal according to a transmission command signal from the central control unit;

a supersonic wave transmitter held by a moving object and adapted to transmit a supersonic wave by detecting the radio wave signal;

a plurality of supersonic wave detecting devices each having a time counter which is initialized by a start command signal from the central control unit to start instrumentation, adapted to stop the instrumentation of the time counter by detecting the supersonic wave transmitted from the supersonic wave transmitter, and disposed in different stationary positions; and a lighting projector provided in a stationary position and having a drive mechanism for shifting its lighting direction, said central control unit including:

a timing-system control part, which sends out a transmission command signal to the effect that a radio wave signal is intermittently transmitted, to the radio wave transmitter, and at the same time as the sending of the transmission command signal, the start command signal to the time counters in all the supersonic wave detecting devices;

an arithmetic part for calculating a coordinate position of the object in a space coordinate system preset on the basis of time data according to the time determined by the time counters in the supersonic wave detecting devices and positional data according to coordinate positions occupied by the supersonic wave detecting devices in the space coordinate system; and a lighting control part for sending out a command signal for control of the lighting direction of the lighting projector on the basis of a positional data according to the thus-calculated coordinate position of the object and a positional data according to a coordinate position of the lighting projector in the space coordinate system.

2. The automatic control system according to claim 1, wherein the arithmetic part in the central control unit processes time data from the supersonic wave detecting devices provided in three different positions, thereby calculating the coordinate position of the object.

3. The automatic control system according to claim 2, wherein the command signal for control of the lighting direction from the central control unit is a signal to the effect that the lighting projector is controlled so as to light up the object.

4. The automatic control system according to claim 2, wherein the command signal for control of the lighting direction from the central control unit is a signal to the effect that the lighting projector is controlled so as to light up a place standing in a specific positional relationship to object.

5. The automatic control system according to claim 2, wherein the command signal for control of the lighting direction from the central control unit is a signal to the effect that the lighting projector is controlled so as to light up a place standing in a positional relationship varying with time in a predetermined form on the basis of the object.

6. The automatic control system according to claim 1 wherein the arithmetic part in the central control unit processes time data from a plurality of the supersonic wave detecting devices which do not exist on a common plane, thereby calculating the coordinate position of the object.

7. The automatic control system according to claim 6, wherein the command signal for control of the lighting direction from the central control unit is a signal to the effect that the lighting projector is controlled so as to light up the object.

8. The automatic control system according to claim 6, wherein the command signal for control of the lighting direction from the central control unit is a signal to the effect that the lighting projector is controlled so as to light up a place standing in a specific positional relationship to the object.

9. The automatic control system according to claim 6, wherein the command signal for control of the lighting direction from the central control unit is a signal to the effect that the lighting projector is controlled so as to light up a place standing in a positional relationship varying with time in a predetermined form on the basis of the object.

10. The automatic control system according to claim 1, wherein the command signal for control of the lighting direction from the central control unit is a signal to the effect that the lighting projector is controlled so as to light up the object.

11. The automatic control system according to claim 1, wherein the command signal for control of the lighting direction from the central control unit is a signal to the effect that the lighting projector is controlled so as to light up a place standing in a specific positional relationship to the object.

12. The automatic control system according to claim 1, wherein the command signal for control of the lighting direction from the central control unit is a signal to the effect that the lighting projector is controlled so as to light up a place standing in a positional relationship varying with time in a predetermined form on the basis of the object.

13. The automatic control system according to claim 1, wherein a time interval of the radio wave signal transmitted from the radio wave transmitter and corresponding to a specific supersonic wave transmitter is 400 msec or shorter.

14. An automatic control system for a lighting projector, comprising:

a central control unit;

a radio wave transmitter for transmitting radio wave signals according to transmission command signals from the central control unit;

supersonic wave transmitters separately held by two or more moving objects and adapted to transmit respective supersonic waves by detecting the radio wave signals identified correspondingly to the supersonic wave transmitters;

a plurality of supersonic wave detecting devices each having a time counter which is initialized by a start command signal from the central control unit to start instrumentation, adapted to stop the instrumentation of their corresponding time counters by detecting the supersonic wave transmitted from the supersonic wave transmitter, and disposed in different stationary positions; and at least one lighting projector provided at stationary position and having a drive mechanism for shifting its lighting direction, said central control unit including:

a timing-system control part, which sends out a transmission command signal to the effect that radio wave signals identified correspondingly to the supersonic wave transmitters are transmitted alternately, to the radio wave transmitter, and at the same time as the sending of the transmission command signal, the start command signal to the time counters in all the supersonic wave detecting devices;

an arithmetic part for calculating coordinate positions of the objects in a space coordinate system preset on the basis of time data according to the time determined by the time counters in the supersonic wave detecting devices and positional data according to coordinate positions occupied by the supersonic wave detecting devices in the space coordinate system; and a lighting control part for sending out their corresponding command signals for control of the lighting directions of the lighting projectors on the basis of positional data according to the thus-calculated coordinate positions of the objects and positional data according to coordinate positions of the lighting projectors in the space coordinate system.

15. The automatic control system according to claim 14, wherein the arithmetic part in the central control unit processes time data from the supersonic wave detecting devices provided in three different positions, thereby calculating the coordinate positions of the objects.

16. The automatic control system according to claim 14, wherein the arithmetic part in the central control unit processes time data from a plurality of the supersonic wave detecting devices which do not exist on a common plane, thereby calculating the coordinate positions of the objects.

17. The automatic control system according to claim 14, wherein the command signal for control of the lighting direction from the central control unit is a signal to the effect that the at least on lighting projector is controlled so as to light up its corresponding object.

18. The automatic control system according to claim 14, wherein the command signal for control of the lighting direction from the central control unit is a signal to the effect that the at least one lighting projector is controlled so as to light up a place standing in a specific positional relationship to its corresponding object.

19. The automatic control system according to claim 14, wherein the command signal for control of the lighting direction from the central control unit is a signal to the effect that the at least one lighting projector is controlled so as to light up a place standing in a positional relationship varying with time in a predetermined form on the basis of its corresponding object.

20. The automatic control system according to claim 14, wherein a time interval of the radio wave signal transmitted from the radio wave transmitter and corresponding to a specific supersonic wave transmitter is 400 msec or shorter.

* * * * *